April 29, 1969 J. T. E. DUNN ET AL Re. 26,570
METHOD AND MECHANISM FOR LUBRICATING THE SHAFT ELEMENTS OF A PUMP ROTOR FOR PUMPING AN ABRADANT-CONTAINING LIQUID
Original Filed Nov. 9, 1962
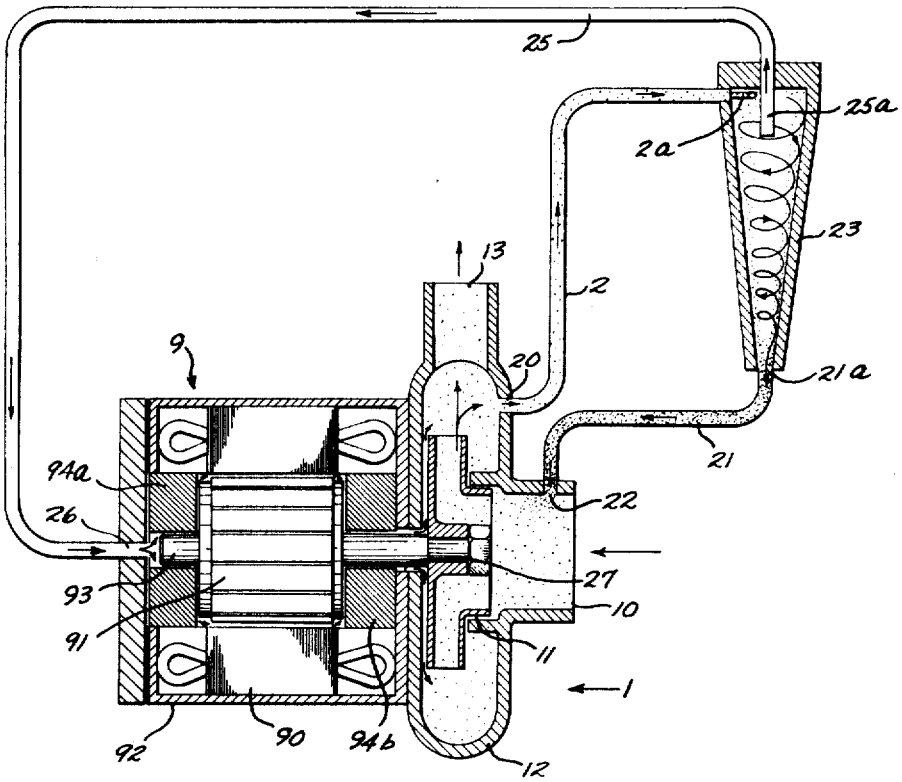
INVENTOR.
JAMES T. E. DUNN
ROBERT J. SLOAT
BY
Reynolds & Christensen
ATTORNEYS United States Patent Office Re. 26,570
Reissued Apr. 29, 1969

26,570

METHOD AND MECHANISM FOR LUBRICATING THE SHAFT ELEMENTS OF A PUMP ROTOR FOR PUMPING AN ABRADANT-CONTAINING LIQUID

James T. E. Dunn, 1521 Butternut, and Robert J. Sloat, 2600 Harris Ave., both of Richland, Wash. 99352

Original No. 3,186,513, dated June 1, 1965, Ser. No. 236,607, Nov. 9, 1962. Application for reissue May 24, 1967, Ser. No. 646,753

Int. Cl. F01m *1/00*

U.S. Cl. 184—1 14 Claims

Matter enclosed in heavy brackets [ ] appears in the original patent but forms no part of this reissue specification; matter printed in italics indicates the additions made by reissue.

*ABSTRACT OF THE DISCLOSURE*

*For use with rotary pumps incorporating shaft-associated elements having mating surfaces bearing upon each other in rubbing contact, which surfaces require a supply of liquid for their lubrication, a method and apparatus for supplying this lubricating liquid by withdrawing liquid from the discharge of the pump and directing it to a centrifugal separator wherefrom clean liquid is withdrawn and is directed to the rubbing surfaces of the shaft-associated elements.*

The minimizing of bearing-*surface* wear in certain *pump shaft* installations is a problem that has received intensive study, yet up to now without a satisfactory solution. Such installations, *for example, may* utilize a canned motor—one which is sealed and requires no normal lubrication after being put into use—to drive a pump rotor that pumps a liquid which contains a certain burden of abrasive particles that are radioactive. The *bearing-surfaces* [bearings] of the motor that drives such a pump, and of the pump rotor, are lubricated by circulating the liquid through the sealed-off bearings of the combination, and filters are relied upon to filter out the abrasive particles. Since one purpose of using a canned motor is to avoid radiation danger by leakage past pump bearing seals, or to persons who would have to lubricate or otherwise service the motor and pump combination, it follows that the use of filters does not eliminate that danger, for the filters must be removed and replaced periodically, and must be disposed of.

Moreover, the filters cannot be relied upon to filter out all abrasive particles, and progressive wear in the bearings from particles that pass the filters shortens the useful life of the combination. The filters tend to clog progressively, and their efficiency varies correspondingly. Also, the filters and the lines to and from them require extra space, and restrict the design of the motors and pumps. Attempts have been made to prolong bearing life by choice of more durable bearing and journal materials, but so far have met with no noteworthy success. The problem persists when the pump liquid contains even minor amounts of abrasive solids.

The present invention deals with this problem, and approaches its solution in a different way. According to this invention the liquid being pumped, whatever the kind or concentration of abrasive particles, is so handled that a liquid circuit bled off the main stream or pump circuit is mechanically cleared—specifically, is centrifugally cleared—of abrasive particles; the particles are returned immediately and continuously to the main pump circuit and pass off with the main stream, and the cleared liquid is passed continuously *to the shaft bearing-surfaces* [through the bearings] and thence back to the main stream. This cleared liquid lubricates and cools the *bearing-surfaces* [bearings], and has been found to increase their useful life by many times the longest life under other conditions.

*By use of the present invention,* [Thereby] the full advantages of a canned motor can be realized, and the entire installation is free of restrictions as to external connections and the use of filters, for none are required; the pump can operate submerged, and is self-contained, for the liquid circuit wherein the lubricating liquid is tapped off, and wherein it is cleared, is small, and can be an integral part of the housing of pump and/or motor, requiring no external lines nor servicing. Moreover, a pump so submerged in the liquid being pumped will not, if it should leak at the bearing seals, constitute a source of dangerous radiation, for the liquid is in any event radioactive.

The invention herein is especially useful in the handling of liquids that contain radioactive particles, and in installations that employ canned motors, and will be described in detail as so employed, but the principles of this invention are also useful in other uses and installations, hence restriction is not to be implied from the specific references, but only as the claims may require. *For example, the invention is useful in any rotary pump installation in which there are incorporated shaft elements having mating surfaces bearing upon each other in rubbing contact, one surface rotating with the pump shaft and the other surface being fixed, and in which the rubbing surfaces require a supply of clean liquid for lubrication.*

Among advantages of this invention are (1) the compactness of the pump, since the means for separation of abradants is small, and readily incorporated in the pump and motor casings themselves, and such compactness promotes ease in handling, increase rigidity, and reduces vibration; (2) bearing requirements are reduced to a minimum, eliminating major alignment problems and reducing the number of wear points; (3) the hermetically sealed motor permits submerged operation, and eliminates the need for foot-valves and/or bottom outlets on tanks, as well as provision for priming; (4) initial and replacement costs are lower than if "standard" long-shaft pumps are used; (5) in-line application of the abrasive-clearing means makes it possible to eliminate the process vessel or pump tank, thus reducing equipment cost and the size of the building for housing the equipment.

The invention is illustrated diagrammatically in the accompanying drawing, which is a sectional view, in a typical form, but with no attempt to show a specific mechanical construction. The invention concerns not only the mechanism, but also the method, by which the bearings are lubricated.

According to this invention a small centrifugal cyclonic separator, often called a hydroclone *or hydrocyclone,* and capable of generating a tangential acceleration velocity of some 7000 G's, is employed, and is connected in the pump's hydraulic circuit in a way which is characteristic of this invention. Hydroclones are not per se new, but the relationship of a hydroclone with the pump's circuit is new, and it is the circuit as a whole, including the hydroclone, that is considered to be the novel subject matter of this invention.

Referring to the drawing, a canned motor 9 including field windings 90 and a rotative armature 91 is housed within a sealed housing 92. The armature's journals 93 are supported in bearings 94a and 94b, sealed off in a compartment within the housing 92. These bearings and journals, which also support the pump rotor, may be of various forms, but should by preference have large bearing areas and be relieved or otherwise have channels for movement through them of a lubricating liquid; this relief is incidated in the drawing by a clearance space between the journals and their bearings. The bearings would normally be of a type to sustain end thrust loads as well as radia thrust loads, but no attempt has been made to represent this or any specific type of bearing, as such are conventional, and constitute no part of this invention. *Bearings 94a and 94b exemplify a type of shaft-associated element having mating surfaces in rubbing contact with each other and thereby requiring a supply of liquid for their lubrication.*

The motor 9 is connected to a pump 1 of suitable type and capacity, as for example one which includes a centrifugal rotor 11, to which the armature 91 is direct-connected, rotative within a scroll or casing 12. Inlet to the pump is at 10 and delivery at 13. Again, the particular type of pump is not a limiting part of this invention, nor is the manner in which it is connected to or driven by the motor 9.

The main pump circuit may be assumed to be one which draws liquid from a source that entrains a certain quantity and type of abrasive particles, of varying sizes, delivering them at 10 into the pump housing, and passing thence from the outlet at 13 under the pressure head afforded by the rotor 11. The pump circuit may be an open one, that is, the delivered liquid may not return to the source, or it may be a closed one, wherein the delivered liquid at 13 returns to the source and eventually is recirculated through the pump. The invention is useful with either a closed or an open main pump circuit. The circuit illustrated is an open one. The relative concentration of particles is shown at various parts of the circuit, exaggeratedly, by the concentration of dots in the drawing.

Coming to the present invention, a clarifying circuit is bled off from the main pump circuit, and usually is returned to the same. The specific locations of the respective bleed-off and return points are not material, so long as there is an effective and adequate pressure difference between such points. The clarifying circuit as shown includes the bleed-off line 2, taking off from the delivery side of the pump housing at 20, and the return line 21, connecting at 22 to the intake side of the pump. The clarifying circuit also includes between its ends a hydroclone 23, to the top of which line 2 is connected to deliver tangentially thereinto by the nozzle 2a, and to the bottom of which hydroclone the return line 21 connects. In addition, a clear water line 25 taps liquid from the vicinity of the axis of the hydroclone, near its inlet 2a, through the nipple 25a. Clear water line 25 connects at 26 to the interior of the motor housing 92, at a point or points where the clear water floods the bearings 94a and 94b, and then finds its way back at 27, near the rotor's axis, to the interior of pump casing 12. The arrows show the direction of flow in the several circuits and lines.

It will be noted that there is a marked pressure difference between the bleed-off point at 20 and the return point at 22. By suitable location of these two points in the pump delivery line from 13 and the pump intake line to 10, or by suitable valve means or the like, this pressure difference can be regulated, but ordinarily it would be desirable to utilize the maximum pressure difference which the pump will afford. The hydroclone 23 is at a pressure corresponding to the pressure difference between 20 and 22, less any line drop. The whirling of the liquid within the hydroclone creates an axial core which is at a lesser pressure than the liquid centrifugally urged against its wall, yet the core's pressure is still greater than the pump's intake pressure, so that the clarified liquid still tends to flow through the bearings 94a and 94b, and to return to the pump intake at 27. Likewise, the pressure difference between 20 and 22 ensures flow to the hydroclone and back to the pump intake.

In operation the pump 1 draws in water (or other liquid) laden with more or less particulate abradants, at 10. The rotor 11 impresses this water with a pressure head. Most of it issues at 13, but a small part is bled off at 20, and is delivered at pressure at the nozzle 2a, directed tangentially of the hydroclone 23. Because of the centrifugal effect therein, and the relatively high specific gravity of the particles suspended in the water, these particles are thrown outwardly, and follow the inner wall of the hydroclone, as shown by the spiral line, and leave the central core of water, at least in the upper portion therein, substantially free of particles. The nipple 25a, within this clear central core, taps off clear water, still under some pressure, and delivers it at 26 to the bearings, which it lubricates and cools. The separated particles follow down the wall of the hydroclone to its drain outlet at 21a to line 21, and are returned at 22, with bled-off water in excess of what is needed for lubrication, to the pump intake, at 10. There they enter the main stream of the pumped liquid, and pass from the pump. The clear water, after lubricating the bearings at 94a and 94b, re-enters the main stream of pumped liquid, in the vicinity of the pump's axis where pressure is lowered, and behind the rotor from the intake at 10, and it too passes from the pump.

It will be seen that the lubricating system is a completely closed one, and requires no servicing or attention. It operates wholly by virtue of pump-created pressures. The hydroclone and its circuit 2, 21, and the clear water line 25, all can be small in size and can be incorporated within or integrated with the housing of the pump and motor. There are no moving parts in the clarifying circuit, hence, the system is free from vibration, and there is nothing to wear, except as the abradants in time may score the wall of the hydroclone. It was found that such a system handling a total weight of 6.7 tons of said (dry weight basis) during the time consumed in a test, at a concentration ratio of 1.744% of the water, under accelerated wear conditions increased the usable life of a canned motor, from the standpoint of bearing abrasion, by a factor of 160. This corresponds to increasing its life expectancy in excess of twenty years, as compared with the presently specified period of two years for pumps and motors in similar service. The clear water was found to contain no particles of a size as large as 5 microns, although initially a high percentage were of a size greater than 35 mesh. The few particles found in the clear water were mostly of a size from 1 to 3 microns, which tended to polish rather than to cut the bearings. Particles ranging from 4 up to 5 microns amounted to no more than 0.1% of the burden of solids in the main steam. Operation of the test pump was smooth and quiet, and noise only developed just prior to termination at 79.6 hours.

The compactness and simplicity of the present system enables the pump to be used in installations for which a similar pump of the filtering type would be awkward, and would require much additional space, lines, and similar complications.

There is no attempt made, in this system, to remove particles from the process liquid. The operation is merely one to prevent entry of particles into the bearings. The system is, in effect, a self-cleaning filter, in which the particles are separated from that portion of the liquid which is to lubricate the bearings, and the particles and the clear liquid are again returned to the main stream, thus disposing of the particles. If desired, the underflow stream, at 22, could be bled off to a settling decanter, where the solids could be isolated from the process, but this seems an unnecessary refinement. There being no filter as such, in the present invention, nor any collection of separated particles, nothing remains for periodical removal or attention, and disposal.

We claim as our invention:

1. A canned motor pump system comprising a casing, a motor driven pump enclosed by said casing and having anti-friction bearings, housing means disposed about said bearing, said pump having an outlet, and having an inlet in liquid-conductive communication with one extremity of the bearing housing means, means forming a clarifying circuit including serially a hydroclone and liquid-conducting connections between such hydroclone and said pump inlet and outlet, thereby to create a core of relatively clear liquid in the hydroclone by operation of the pump, and, a liquid-conducting connection from the hydroclone core region to an opposite extremity of the bearing housing means, whereby pump suction draws relatively clear liquid from the hydroclone through such bearings.

2. A pumping apparatus adapted for transferring a liquid having abradant material therein comprising in combination: an electric motor having an armature; a pump having a low pressure liquid inlet and a high pressure liquid outlet and including a rotor connected to said armature; bearing means supporting said armature and said rotor for rotation; housing means enclosing said armature and said bearing means; a hydroclone having a high pressure inlet, a clear liquid tap, and an outlet; first liquid conduit means connected to said high pressure inlet and said high pressure outlet adapted to provide liquid under pressure from said pump to said hydroclone; second liquid conduit means extending from said tap, through said housing and communicating with said bearings, and to said pump adapted to provide clear liquid from said hydroclone to said bearings; and third liquid conduit means connected to said hydroclone outlet.

3. A liquid pumping apparatus comprising in combination: an electric motor having bearings; a pump connected to said motor and adapted to be driven thereby, said pump having an inlet for receiving liquid at a first pressure and an outlet for discharging liquid at a second pressure which is higher than said first pressure; a hydrocyclone having an inlet connected to said pump at a location to receive liquid from said pump at a pressure greater than said first pressure, an outlet connected to said pump inlet, and a clear liquid tap; and means defining a liquid conduit having said bearings disposed therein connected to said tap and having a discharge opening maintained at a pressure lower than said second pressure.

4. The combination with a canned motor pump which includes a rotor and having a high pressure side and a low pressure side and adapted to deliver a main stream of liquid, means enclosing the motor and the rotor having pump intake and discharge openings, bearings disposed within said means for rotatively supporting the rotor, a bleed-off circuit connected at one end to the high pressure side of the pump, and at its other end to a region of lesser pressure than the pressure in said high pressure side, a hydrocyclone connected between the ends of said bleed-off circuit, to receive liquid from and return it to the bleed-off circuit, a clear liquid line tapping the axial core of said hydroclone and leading liquid thence to the bearings, and means to conduct the clear liquid from the bearings to a region of pressure lower than the pressure in said high pressure side.

5. The combination of claim 4, wherein the bleed-off circuit is connected, at its end opposite the connection to the high pressure side of the pump, to the low pressure side of the pump, to constitute a closed circuit.

6. The combination of claim 4, wherein the conducting means for the clear liquid connects with the low pressure side of the pump to return the clear liquid to the main stream.

7. A lubricating system for a canned motor and pump which includes a rotor and having a high pressure side and a low pressure side, enclosure means enclosing the motor and the rotor, said enclosure means being formed with a pump intake and a pump discharge opening, motor and rotor bearings carried by said enclosure means, a bleed-off circuit connected at one end to said high pressure side of the pump, and at its opposite end to said low pressure side of the pump, a hydroclone connected in said bleed-off circuit between its ends, and arranged to direct liquid from said high pressure side of the pump tangentially within the hydroclone and to return liquid to the low pressure side of the pump, a clear liquid line tapping the axial core of said hydroclone and leading liquid thence to said bearings, and means to conduct the clear liquid from the bearings to a region of pressure lower than the pressure in said high pressure side of the pump.

8. The method of lubricating the bearings of a canned motor pump rotor combination having a high pressure side and a low pressure side used in pumping liquid which contains abradants, which method comprises bleeding off liquid from said high pressure side, delivering the bled-off liquid to a region of pressure lower than the pressure in said high pressure side, centrifuging the bled-off liquid to define a clear liquid core, and tapping off clear liquid from such core and delivering it to the bearings of the motor-rotor combination.

9. The method specified in claim 8, wherein the tapped-off clear liquid, after lubricating the bearings, is returned to said low pressure side.

*10. A liquid pumping apparatus comprising in combination a pump having a housing, a rotor, an inlet for receiving liquid at a first pressure, and an outlet for discharging liquid at a second pressure which is higher than said first pressure; a drive shaft connected to said pump rotor; a shaft-associated means defining a pair of annular, mating surfaces in rubbing contact with each other, one said surface rotating with said shaft and the other surface being non-rotatively fixed with respect to said housing, said rubbing surfaces requiring a supply of liquid for lubrication; a hydrocyclone having an inlet connected to said pump at a location to receive liquid from said pump at a feed pressure greater than said first pressure, an outlet connected to said pump inlet, and a clear liquid tap; and means defining a liquid conduit for transferring clear liquid from said tap to supply said rubbing surfaces and discharging to a pressure lower than said hydrocyclone feed pressure.*

*11. A liquid pumping apparatus as defined in claim 10 wherein said hydrocyclone inlet is connected to said pump outlet and wherein said clear liquid conduit discharges back to said pump.*

*12. A method of lubricating the annular mating rubbing surfaces of the shaft elements in rotary pumps having a high pressure side and a low pressure side and used in pumping liquid which contains abradants, which method comprises bleeding off liquid from said high pressure side, delivering the bled-off liquid to a region of pressure lower than the pressure in said high pressure side, centrifuging the bled-off liquid to define a clear liquid core, and tapping off clear liquid from such core and delivering it as a lubricating fluid to the rubbing surfaces of the pump shaft elements.*

*13. A method as defined in claim 12 including the step of removing abradant-carrying liquid from around the clear liquid core and returning same to the low pressure side of the pump.*

*14. An apparatus for pumping impurity-carrying liquid comprising:*

*(a) a pump having a shaft, a rotor, a housing, an inlet, a discharge, and a shaft-associated element having annular mating surfaces in rubbing contact, one an-*

*nular surface rotating with the shaft and the other surface being fixed, the rubbing surfaces thereby requiring a supply of liquid for lubrication;*

(*b*) *a hydrocyclone for separating clear liquid from impurity-carrying liquid having an inlet connected to the pump discharge, an outlet for impurity-carrying liquid connected to the pump inlet, and a clear liquid outlet connected to the shaft-associated element to supply liquid thereto for lubrication of the annular mating surfaces.*

References Cited

The following references, cited by the Examiner, are of record in the patented file of this patent or the original patent.

UNITED STATES PATENTS

| | | | |
|---|---|---|---|
| 2,741,990 | 4/1956 | White | 103—87 |
| 2,963,980 | 12/1960 | White | 103—111 |
| 3,011,638 | 12/1961 | Glover | 210—512 X |
| 3,257,957 | 6/1966 | Tracy. | |

FOREIGN PATENTS

| | | |
|---|---|---|
| 988,508 | 5/1951 | France. |

HOUSTON S. BELL, Jr., *Primary Examiner.*

U.S. Cl. X.R.

184—6; 210—168, 512; 103—87, 111